(12) United States Patent
Natanzon et al.

(10) Patent No.: US 9,588,703 B1
(45) Date of Patent: Mar. 7, 2017

(54) METHOD AND APPARATUS FOR REPLICATING THE PUNCH COMMAND

(71) Applicant: EMC Corporation, Hopkinton, MA (US)

(72) Inventors: Assaf Natanzon, Tel Aviv (IL); Saar Cohen, Moshav (IL); Lev Ayzenberg, Petach Tikva (IL); Ariel Kulik, Rehovot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/665,110

(22) Filed: Mar. 23, 2015

Related U.S. Application Data

(63) Continuation of application No. 13/073,215, filed on Mar. 28, 2011, now Pat. No. 8,996,461.

(51) Int. Cl.
*G06F 17/30* (2006.01)
*G06F 3/06* (2006.01)

(52) U.S. Cl.
CPC ............ *G06F 3/0619* (2013.01); *G06F 3/065* (2013.01); *G06F 3/0659* (2013.01); *G06F 3/0665* (2013.01); *G06F 3/0689* (2013.01); *G06F 17/30138* (2013.01); *G06F 17/30191* (2013.01); *G06F 17/30212* (2013.01); *G06F 17/30575* (2013.01)

(58) Field of Classification Search
CPC ................. G06F 3/065; G06F 11/2082; G06F 2201/855; G06F 11/1469; G06F 11/2064; G06F 17/30312; G06F 17/30575; G06F 17/30345; G06F 17/30371; G06F 17/30067; G06F 17/30191; G06F 17/30368; G06F 17/30091; G06F 17/3007
USPC .................................. 707/634–660; 711/162
See application file for complete search history.

(56) References Cited

U.S. PATENT DOCUMENTS

| | | | | |
|---|---|---|---|---|
| 6,779,093 | B1 * | 8/2004 | Gupta | G06F 17/30578 707/E17.005 |
| 7,500,047 | B1 * | 3/2009 | Tyndall | H04L 69/08 710/105 |
| 7,603,532 | B2 * | 10/2009 | Rajan et al. | 711/166 |
| 7,779,100 | B2 * | 8/2010 | Jiang et al. | 709/223 |
| 8,156,282 | B1 * | 4/2012 | Taylor | G06F 3/0611 711/114 |

(Continued)

*Primary Examiner* — Michelle Owyang
(74) *Attorney, Agent, or Firm* — Krishnendu Gupta; Robert Kevin Perkins; Andre Gibbs

(57) ABSTRACT

The punch command may be replicated in a replication environment including a production site and a replication site. The solution includes implementing a punch command to free storage received at a replication site in a replication environment by applying the punch command to storage at the replication site and writing data being freed from the storage at the replication site to an undo stream of a journal at the replication site. If the punch command is not supported, a command to write zeros may be used. Further, an unpunch command is provided for properly undoing a punch command and storing data written to the volume before the punch command freed the storage. Additionally, large punch commands may be split into a plurality to smaller punch commands for efficient journal management. Additionally, volume space may be reclaimed by writing a punch command to the journal instead of zeros.

19 Claims, 7 Drawing Sheets

(56) References Cited

U.S. PATENT DOCUMENTS

| | | | |
|---|---|---|---|
| 8,230,187 B1* | 7/2012 | Krinke, II | G06F 11/1456 |
| | | | 711/156 |
| 8,266,099 B2* | 9/2012 | Vaghani | 707/609 |
| 8,433,869 B1* | 4/2013 | Natanzon | G06F 3/065 |
| | | | 707/634 |
| 8,694,563 B1* | 4/2014 | Cameron | G06F 17/30138 |
| | | | 707/812 |
| 2004/0139240 A1* | 7/2004 | DiCorpo | G06F 3/0617 |
| | | | 710/3 |
| 2007/0162513 A1* | 7/2007 | Lewin | G06F 17/30368 |
| 2007/0271422 A1* | 11/2007 | Osaki | G06F 21/568 |
| | | | 711/154 |
| 2008/0082591 A1* | 4/2008 | Ahal et al. | 707/204 |

* cited by examiner

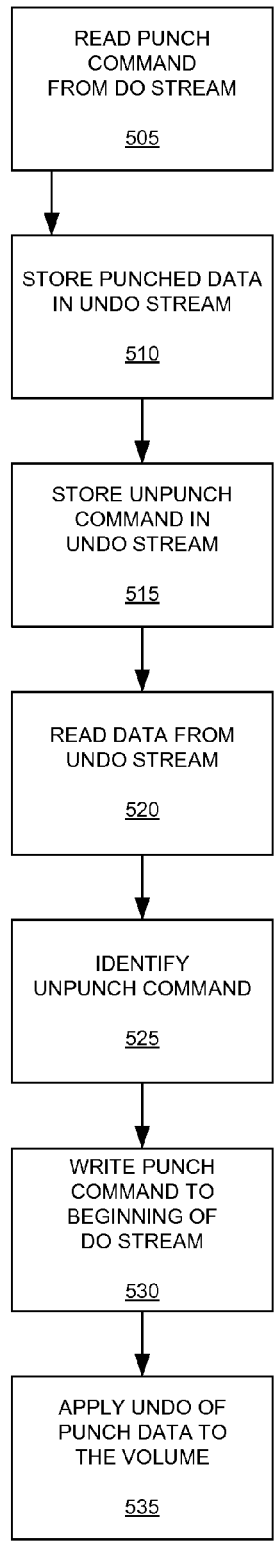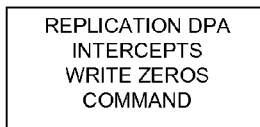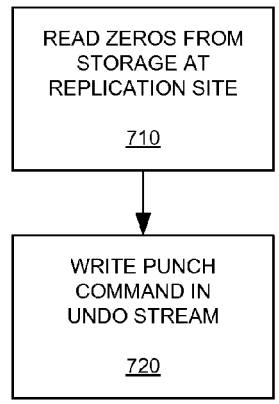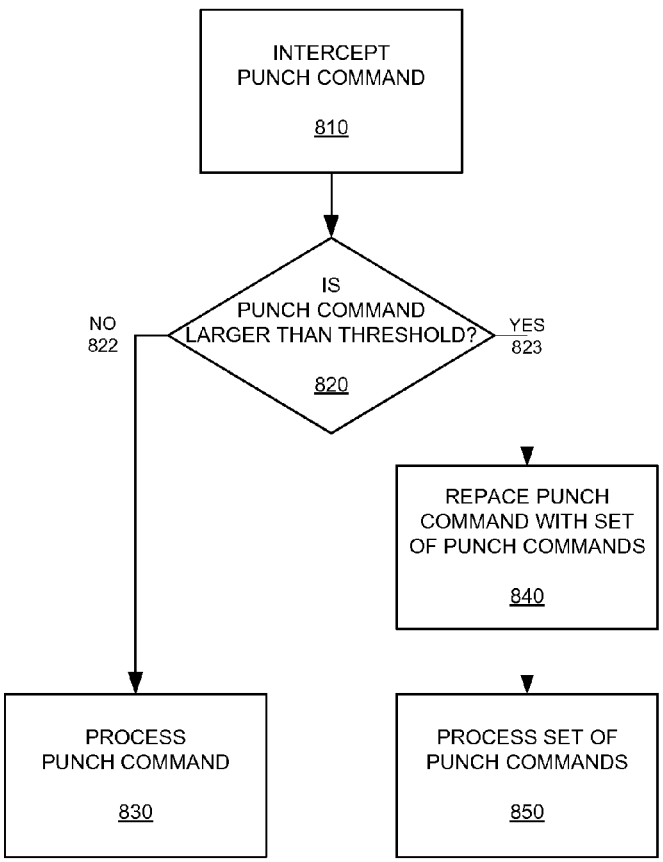

METHOD AND APPARATUS FOR REPLICATING THE PUNCH COMMAND

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is a Continuation of U.S. patent application Ser. No. 13/073,215 entitled "METHOD AND SYSTEM FOR REPLICATING THE PUNCH COMMAND" filed on Mar. 28, 2011, the teachings of which application are hereby incorporated herein by reference in their entirety.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention include a method, system and computer program product for implementing a punch command to free storage in a replication environment including a production site and a replication site. The method comprises receiving the punch command at the replication site, applying the punch command to storage at the replication site and writing data being freed from the storage at the replication site to an undo stream of a journal at the replication site.

BRIEF DESCRIPTION OF THE DRAWINGS

The above and further advantages of the present invention may be better under stood by referring to the following description taken into conjunction with the accompanying drawings in which:

FIG. 5 is a flow diagram illustrating an example method of storing an unpunch command in an undo stream of a journal after rolling the journal back through a punch command;

FIG. 6 is a flow diagram illustrating an example method of writing a punch command in the do stream of a journal at a replication site instead of writing zeros to reclaim space in the journal after intercepting a command to write zeros to storage;

FIG. 7 is a flow diagram illustrating an example method of writing a punch command in an undo stream of a journal at a replication site instead of writing zeros to reclaim space in the journal after reading zeros from storage at the replication site;

FIG. 8 is a flow diagram illustrating a method of processing punch commands exceeding a threshold value;

DETAILED DESCRIPTION

Figure 1:
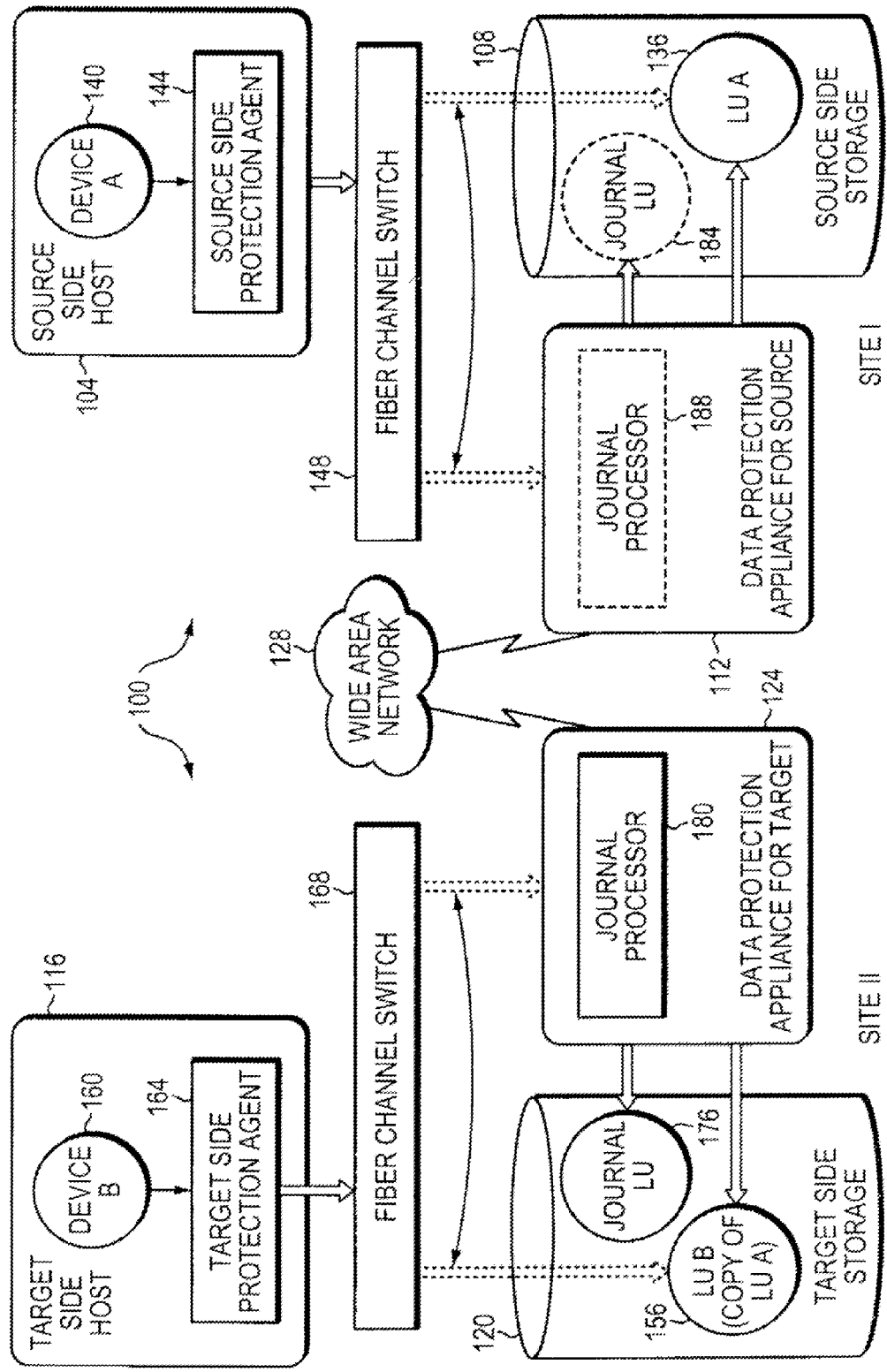
FIG. 1 is a simplified illustration of a data protection system, in accordance with an embodiment of the present invention.

Generally, storage arrays are starting to support new types of commands. One such command is the punch command which frees or zeros data in a storage array (e.g., a thin LUN) and typically saves storage resources. Conventionally, the punch command presents several shortcomings. For example, first, the punch command may not be supported by storage in a replication environment. Additionally, data may be free at the production site of the replication environment while replication is inactive. However, when replication becomes active, corresponding data must be freed at the replication site of the replication environment. Moreover, properly undoing a punch command requires remembering which data was written to the volume before the punch command freed the storage. Because the punch command may punch large holes in the volume (e.g., 1 GB or more), this may pose as a significant challenge because the punched data must be written to the undo stream of the journal, thereby requiring significant storage and processing resources.

Accordingly, in some embodiments of the present invention, the punch command may be replicated in a replication environment including a production site and a replication site. The solution includes implementing a punch command to free storage received at a replication site in a replication environment by applying the punch command to storage at the replication site and writing data being freed from the storage at the replication site to an undo stream of a journal at the replication site.

In certain embodiments, the method includes writing an unpunch command to an undo stream of the journal when applying a punch command from a do stream of the journal to the storage at the replication site to indicate that the data in the storage need not be read when moving back to an older point in time. Moreover, in other embodiments in which the punch command is not supported, the punch command is applied by determining whether the punch command is supported by storage at the replication site and sending a command to the storage to write zeros to a portion of the storage indicated by the punch command if the punch command is not supported by the storage.

The storage at the replication site and the production site may be thin volumes, and a replication appliance at the replication site that supports the punch command may keep the thin volume at the replication site as thin as the thin volume at the production site by, after reading zeros from the do stream for applying to the thin volume, writes a punch command to the undo stream instead of writing zeros to the undo stream if the zeros indicate the portion of the storage is unallocated. Otherwise, the replication application writes zeros to the undo stream.

The punch command may be received at the replication site from a replication appliance at the production site that received the punch command for processing from a splitter at the production site that intercepted the punch command. The replication appliance at the production site may process the punch command, if supported. However, if the replication appliance at the production site does not support the punch command, the replication appliance notifies the splitter which, in turn, sends a command to the replication device at the production site to write zeros to a portion of the storage indicated by the punch command. For example, if the punch command indicated the replication device should punch out blocks 10-20, the command to write zeros includes a command to writes zeros in blocks 10-20. The splitter then may send the command processed at the replication appliance at the production site to the production volume for processing.

In other embodiments in which the replication appliance supports the punch command, the replication appliance at the production site tracks the punch command offset and block number in a delta marking stream at the replication device at the production site. Alternatively, in another embodiment in which the replication appliance supports the punch command, the replication appliance may intercept a command to write zeros to the portion of the storage and, instead of writing the zeros to the do stream, writes a punch command in the do stream of the journal at the replication site to reclaim space in the journal. In a further embodiment in which the punch command is support, the replication appliance may read zeros from the storage at the replication site and, instead of writing zeros to the undo stream, writes a punch command in the undo stream of the journal at the replication site to reclaim space in the journal.

In an alternate embodiment in which the punch command is not supported at the replication site, the replication appliance at the production site may discontinue sending punch commands to the replication site for a period of time and, instead, send commands to write zeros to the portion of the storage indicated by the punch command during the period of time. The replication appliance at the production site then may, periodically, send punch commands as received to determine whether the punch command is currently supported at the replication site.

Further, because the punch command may be quite large, in certain embodiments the replication appliance at the replication site may determine whether a size of the punch command exceeds a threshold and, if the size of the punch command exceeds the threshold, divides the punch command into a plurality of commands having sizes that do not exceed the threshold (e.g., 0.5 MB).

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
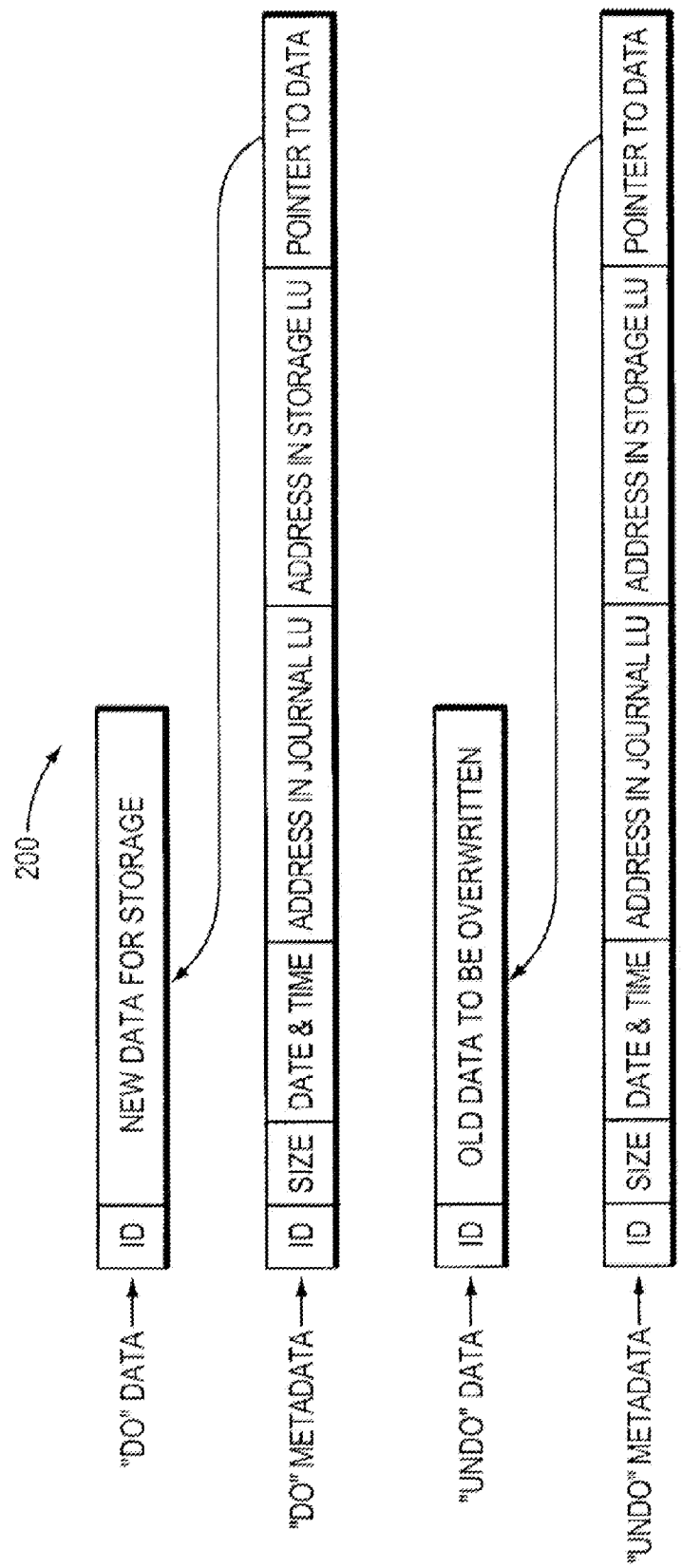
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION ASSIGNED," issued on Nov. 23, 2010 and assigned to EMC Corporation of Hopkinton, Mass., which is hereby incorporated by reference in its entirety.

Replicating the Punch Command

Figure 3:
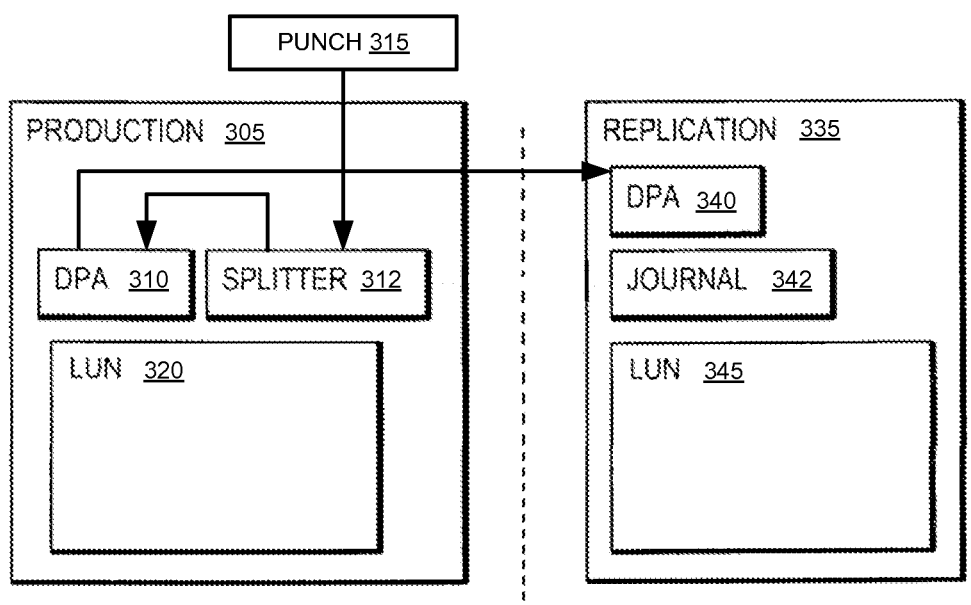
FIG. 3 is an illustration of a simplified method of replicating the punch command, in accordance with an embodiment of the present invention.

FIG. 3 is an illustration of a simplified method of replicating a punch command 315, in accordance with an embodiment of the present invention. FIG. 3 is intended to be read in conjunction with the flow diagram of FIGS. 4A-4B illustrating an example embodiment method according to the present invention.

Figure 4A:
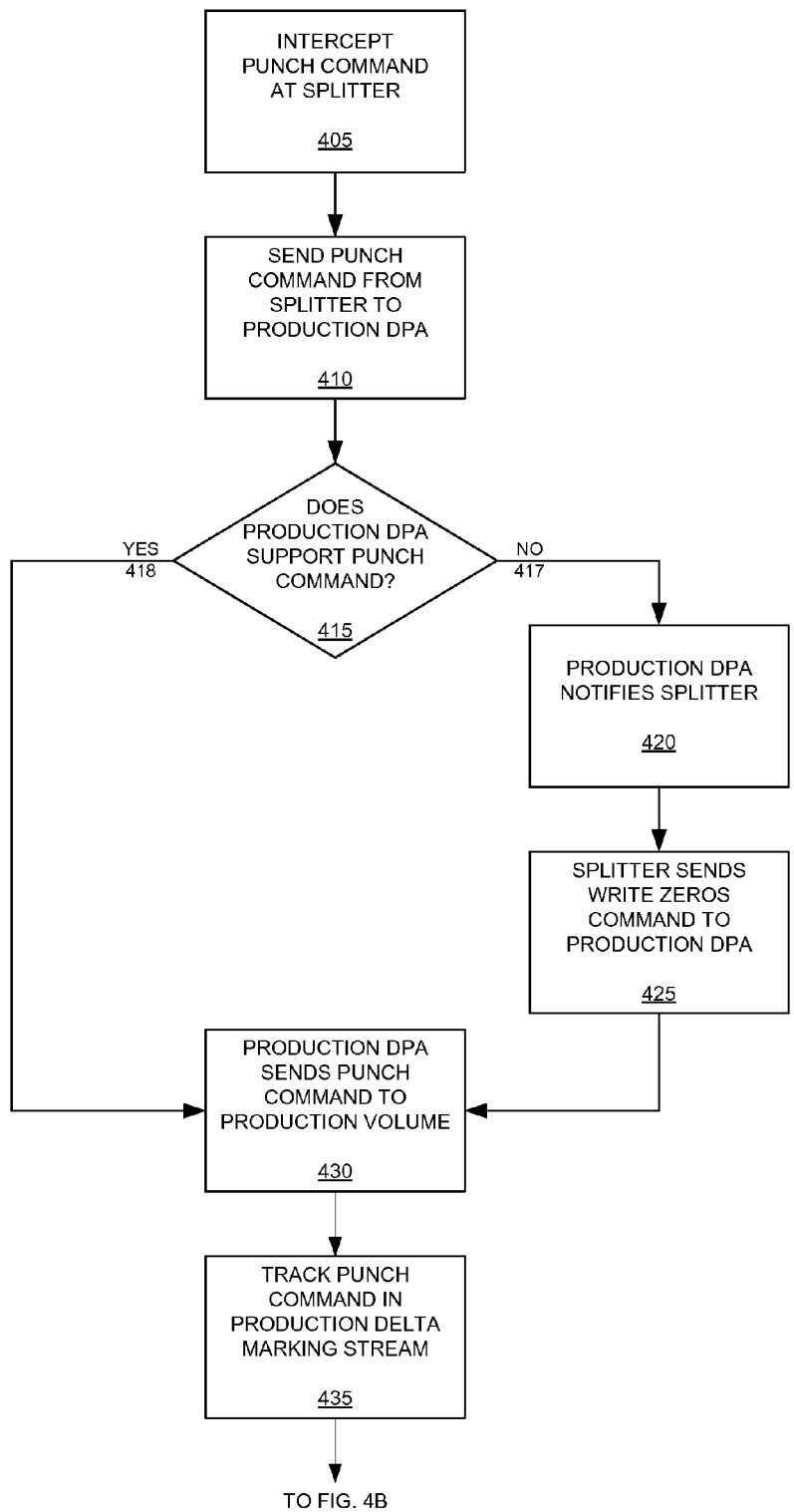
FIGS. 4A-4B are a flow diagram illustrating an example embodiment method according to the present invention.

As illustrated in FIGS. 3 and 4A, the punch command 315 is intercepted by a splitter 312 at a production site 305 (405). The splitter 312 then sends the punch command to the production site DPA 310 (410). It is then determined whether the production site DPA 310 supports the punch command (415). If the production site DPA 310 does not support the punch command (417), the production site DPA 310 notifies the splitter 312 which, in turn, sends a command to the production site DPA 310 to write zeros to a portion of the storage 320 indicated by the punch command 315 (425). Then, the production site DPA 310 sends the punch command to the production site volume 320 (430). The production site DPA 310 also may track the punch command 315 in a delta marking stream of the production site 305.

Figure 4B:
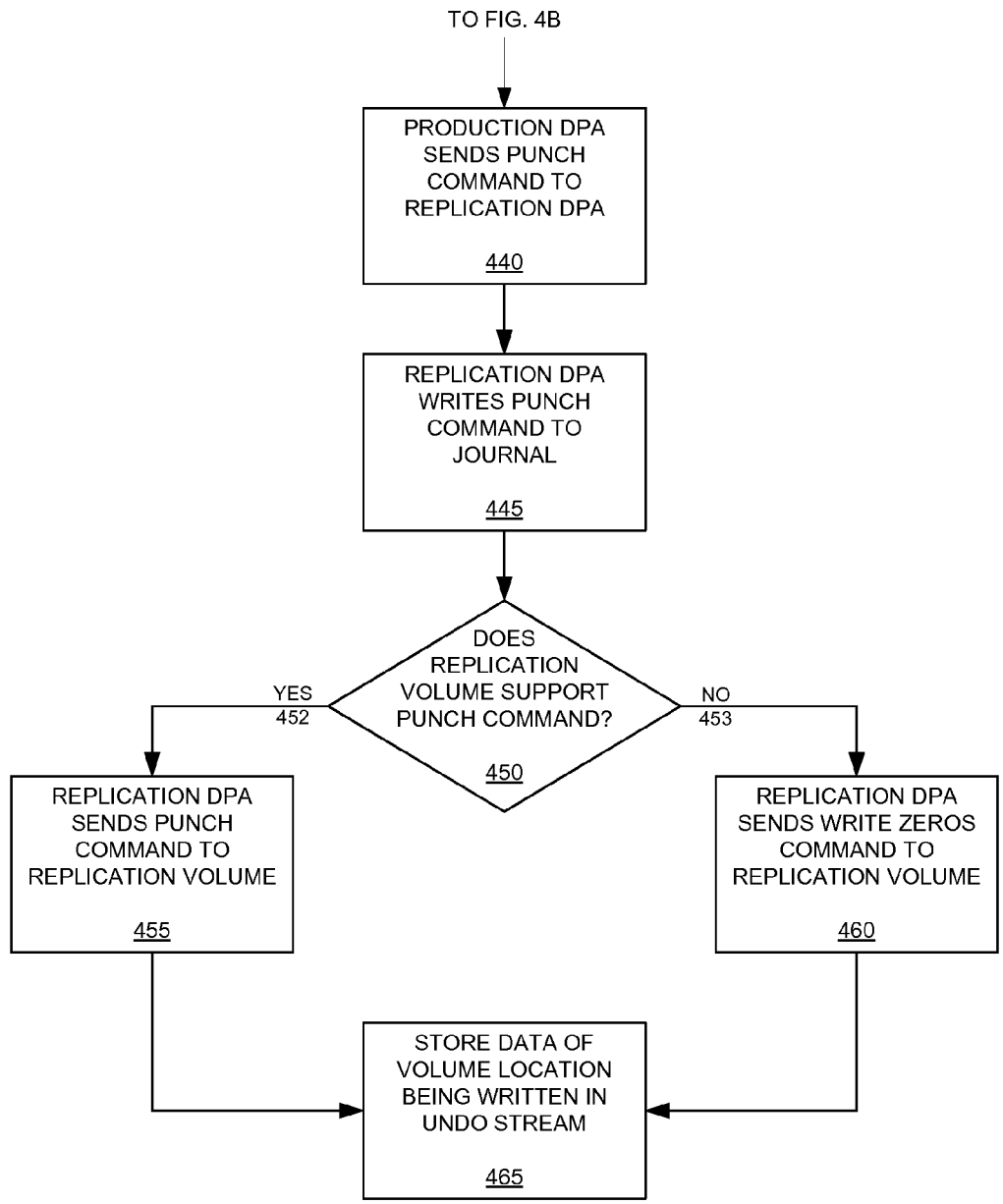

As illustrated in FIGS. 3 and 4B, the production site DPA 310 may send the punch command 315 to the replication site DPA 340 (440). In turn, the replication site DPA 340 may write the punch command 315 to the journal 342 (445). It is then determined whether the replication site volume 345 supports the punch command (450). If the replication site volume 345 supports the punch command (452) the replication site DPA 340 sends the punch command to the replication site volume 345 (455). If the replication site volume 345 does not support the punch command (453) the replication site DPA 340 send a command to write zeros to the replication volume 345 to portions of the replication volume 345 indicated in the punch command (460). The replication site DPA 340 then stores data from the replication volume 345 being punched (455) or written as zeros (460) in an undo stream of the journal 342 (465) along with an unpunch command. An unpunch command is a meta data attached to some data in a stream indicating the data was punched out of the volume. This indication is used to replace this data by a punch command when moving the system back to an older point in time, and is used to keep the remote volume as thin as the production volume (e.g., the user has indicated that remote volume needs to be as thin as the production volume and not as thin as possible).

FIG. 5 is a flow diagram illustrating an example method of storing an unpunch command in an undo stream of a journal after applying a punch command from the do stream to the user volume. When the replication site DPA reads a punch command from the do stream (505), the data is punched and stored in the undo stream (510) with an unpunch command (515).

When the replication DPA rolls back in time to a previous point in time, the undo data is read from the undo stream (520). When the unpunch command is identified (525), data need not be read from the user volume because the replication site DPA then knows that the user volume data is punched out. The replication site DPA then stores in the do stream a punch command instead to the beginning of the do stream (530) and then applies the unpunch data to the user volume (535). In this manner, the replication site DPA is able to keep the remote volume thin without a need to query the volume to determine if areas are thin.

FIG. 6 is a flow diagram illustrating an example method of writing a punch command in the do stream of a journal at a replication site instead of writing zeros to reclaim space in the journal after intercepting a command to write zeros to storage. As illustrated in FIG. 6, the replication site DPA intercepts a command to write zeros to a portion of the volume as indicated by a punch command (610). However, instead of writing the command to write zeros to the volume to the do stream, the replication site DPA writes a punch command in the do stream of the journal to reclaim space in the journal (620). This method allows replication from a thick device to a thin device. It can be controlled by the user if it is desired to replace writes with punches. In some cases, the user may want to block such behavior because writing zeros may be used to reserve space for the volume.

FIG. 7 is a flow diagram illustrating an example method of writing a punch command in an undo stream of a journal at a replication site instead of writing zeros to reclaim space in the journal after reading zeros from storage at the replication site. As illustrated in FIG. 7, the replication site DPA reads zeros from the storage volume at the replication site (710). However, instead of writing the zeros to the undo stream of the journal at the replication site, the replication site DPA writes a punch command in the undo stream to reclaim space in the journal. It should be understood that a user can control whether the remote volume should be maintained as thin as possible or only as thin and the production volume. If the replication volume should be as thin as the production volume and if the replication site DPA reads zeros from the storage, the volume is queried whether the storage is allocated. If the storage is not allocated a punch command is stored to the do stream. Likewise, if the replication volume is configured to remain as thin as possible, a punch command is stored.

FIG. 8 is a flow diagram illustrating a method of processing punch commands exceeding a threshold value. First, the splitter intercepts a punch command (810). The splitter then determines whether the punch command exceeds a threshold (820). If the punch command does not exceed a threshold (822), the splitter processes the punch command 830 as discussed above. If the punch command does exceed a threshold (823), the splitter replaces the punch command with a set of punch commands that do not exceed the threshold (840). The splitter then processes the set of punch commands (850).

For example, if a maximum allowed punch size is 1024 blocks and a received punch command is intercepted that includes instructions to punch starting at offset 1024 for 4096 blocks, it is determined that the 4096-block command exceeds the 1024-block threshold. Accordingly, the 4096-block punch command is replaced by 1024-block punch commands starting at offsets 1024, 2048, 3072 and 4096.

Figure 9:
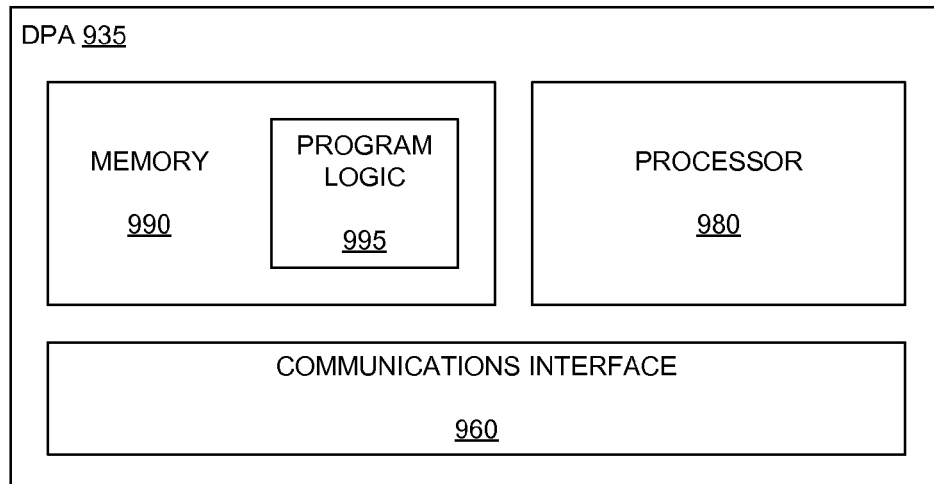
FIG. 9 is a block diagram of an example embodiment apparatus according to the present invention.

FIG. 9 is a block diagram of an example embodiment DPA 935 according to the present invention. The DPA 935 includes memory 990 storing program logic 995, a processor 980 and a communications interface 960.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 10:
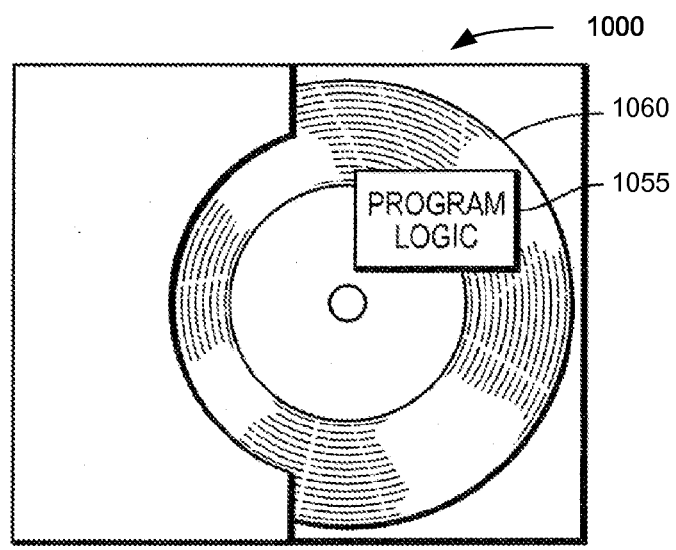
FIG. 10 is an illustration of an example embodiment of the present invention as embodied in program code.

FIG. 10 shows program logic 1055 embodied on a computer-readable medium 1060 as shown, and wherein the logic is encoded in computer-executable code configured for carrying out the gas controlling process of this invention and thereby forming a computer program product 1000.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   receiving, at a data protection appliance at a replication site, a punch command sent from a data protection appliance at a production site, the punch command sent by the data protection appliance at the production site regardless of whether storage at the replication site supports the punch command;
   writing the punch command received from the data protection appliance at the production site in a journal at the replication site;
   applying, by the data protection appliance at the replication site, the punch command to storage at the replication site, wherein the storage at the replication site comprises a thin logical volume, wherein the punch command is applied by the data protection appliance at the replication site in response to the punch command received from the data protection appliance at the production site, comprising:
   determining whether the punch command is supported by the thin logical volume at the replication site prior to sending the punch command to the thin logical volume at the replication site;
   if the punch command is supported by the thin logical volume at the replication site, sending the punch command to the thin logical volume at the replication site to free data from the storage; and if the punch command is not supported by the thin logical volume at the replication site, sending a command to the thin logical volume at the replication site to write zeros to a portion of the thin logical volume at the replication site indicated by the punch command to free data from the storage; and writing data being freed from the storage at the replication site to an undo stream of the journal at the replication site in response to the punch application.

2. The method of claim 1 wherein the production site includes a storage that comprises thin logical volumes, and wherein the data protection appliance at the replication site is configured to keep the thin logical volumes at the replication site as thin as the thin logical volumes at the production site, the method further comprising:

reading zeros from a do stream for applying to the thin logical volumes;

writing the punch command to the undo stream if the zeros indicate the portion of the storage at the replication site is unallocated; and writing zeros to the undo stream otherwise.

3. The method of claim 1 wherein the punch command received at the data protection appliance at the replication site is intercepted by a splitter at the production site and sent to the data protection appliance at the production site for processing prior to sending the punch command to the data protection appliance at the replication site.

4. The method of claim 3 wherein if the data protection appliance at the production site is configured to process the punch command, the data protection appliance at the production site processes the punch command, and if the protection at the production site is not configured to process the punch command, the data protection appliance at the production site notifies the splitter at the production site that the data protection appliance at the production site does not support the punch command which, in turn, sends a command to the data protection appliance at the production site to write zeros to a portion of the storage at the replication site indicated by the punch command.

5. The method of claim 4 wherein the splitter, after processing of the punch command by the data protection appliance at the production site, sends the punch command to a production volume for processing.

6. The method of claim 4 wherein the data protection appliance at the production site tracks the punch command offset and block number in a delta marking stream at the data protection appliance at the production site.

7. The method of claim 4 further comprising: intercepting a command to write zeros to the portion of the storage indicated by the punch command; and writing the punch command in a do stream of the journal at the replication site instead of the zeros to reclaim space in the journal at the replication site.

8. The method of claim 4 further comprising:

reading zeros from the storage at the replication site; and writing the punch command in the undo stream of the journal at the replication site instead of the zeros to reclaim space in the journal at the replication site.

9. The method of claim 4 wherein the punch command is not supported, the method further comprising:

discontinuing sending punch commands for a period of time;

sending commands to write zeros to the portion of the storage indicated by the punch command during the period of time; and periodically sending punch commands as received to determine whether the punch command is supported.

10. A system for implementing a punch command to free storage in a replication environment, the system comprising:

a processor;

a data protection appliance at a production site;

a data protection appliance at a replication site; and computer-executable logic in memory comprising instructions that, when executed by the processor, causes the data protection appliance at the replication site to perform the operations of:

receiving, at the data protection appliance at the replication site, the punch command sent from the data protection appliance at the production site, the punch command sent by the data protection appliance at the production site regardless of whether storage at the replication site supports the punch command;

writing the punch command received from the data protection appliance at the production site in a journal at the replication site;

applying, by the data protection appliance at the replication site, the punch command to storage at the replication site, wherein the storage at the replication site comprises a thin logical volume, where the punch command applied by the data protection appliance at the replication site in response to the punch command received from the data protection appliance at the production site, comprising:

determining whether the punch command is supported by the thin logical volume at the replication site prior to sending the punch command to the thin logical volume at the replication site;

if the punch command is supported by the thin logical volume at the replication site, sending the punch command to the thin logical volume at the replication site to free data from the storage; and if the punch command is not supported by the thin logical volume at the replication site, sending a command to the thin logical volume at the replication site to write zeros to a portion of the thin logical volume at the replication site indicated by the punch command to free data from the storage; and writing data being freed from the storage at the replication site to an undo stream of the journal at the replication site in response to the punch application.

11. The system of claim 10 wherein the production site includes a storage that comprises thin logical volumes, and wherein the data protection appliance at the replication site is configured to keep the thin logical volumes at the replication site as thin as the thin logical volumes at the production site, the computer-executable logic in memory further comprising instructions that, when executed by the processor, cause the data protection appliance at the replication site to perform the operations of:

reading zeros from a do stream for applying to the thin logical volumes;

writing the punch command to the undo stream if the zeros indicate the portion of the storage at the replication site is unallocated; and writing zeros to the undo stream otherwise.

12. The system of claim 10 further comprising a splitter at the production site configured to intercept the punch command at the replication site and send the punch command to the data protection appliance at the production site for processing prior to sending the punch command to the data protection appliance at the replication site.

13. The system of claim 12 wherein the data protection appliance at the production site is configured to process the punch command, if supported, and, if not supported, notify the splitter at the production site that the data protection appliance at the production site does not support the punch command which, in turn, is configured to send a command to the data protection appliance at the production site to write zeros to a portion of the storage at the replication site indicated by the punch command.

14. The system of claim 13 wherein the splitter at the production site, after processing of the punch command by the data protection appliance at the production site, is configured to send the punch command to a production volume for processing.

15. The system of claim 13 wherein the data protection appliance at the production site is configured to track the punch command offset and block number in a delta marking stream at the data protection appliance at the production site.

16. The system of claim 13 further comprising computer-executable logic in memory comprising instructions that, when executed by the processor, cause the data protection appliance at the replication site to perform the operations of:
   intercepting a command to write zeros to the portion of the storage indicated by the punch command; and
   writing the punch command in a do stream of the journal at the replication site instead of the zeros to reclaim space in the journal at the replication site.

17. The system of claim 13 further comprising computer-executable logic in memory comprising instructions that, when executed by the processor, cause the data protection appliance at the replication site to perform the operations of:
   reading zeros from the storage at the replication site; and
   writing the punch command in the undo stream of the journal at the replication site instead of the zeros to reclaim space in the journal at the replication site.

18. The system of claim 13 wherein the punch command is not supported at the replication site, the system further comprising computer-executable logic in memory comprising instructions that, when executed by the processor, cause the data protection appliance at the production site to perform the operations of:
   discontinuing sending punch commands to the replication site for a period of time;
   sending commands to write zeros to the portion of the storage indicated by the punch command during the period of time; and
   periodically sending punch commands as received to the replication site to determine whether the punch command is supported.

19. A computer program product having a non-transitory computer readable storage medium operable to store computer program logic embodied in computer program code encoded thereon for implementing a punch command to free storage in a replication environment including a production site and a replication site, the computer program product comprising:
   computer program code for receiving, at a data protection appliance at the replication site, the punch command sent from a data protection appliance at the production site, the punch command sent by the data protection appliance at the production site regardless of whether storage at the replication site supports the punch command;
   computer program code for writing the punch command received from the data protection appliance at the production site in a journal at the replication site;
   computer program code for applying, by the data protection appliance at the replication site, the punch command to storage at the replication site, wherein the storage at the replication site comprises a thin logical volume, wherein the punch command applied by the data protection appliance at the replication site in response to the punch command received from the data protection appliance at the production site, comprising:
      computer program code for determining whether the punch command is supported by the thin logical volume at the replication site prior to sending the punch command to the thin logical volume at the replication site;
      computer program code for, if the punch command is supported by the thin logical volume at the replication site, sending the punch command to the thin logical volume at the replication site to free data from the storage; and
      computer program code for, if the punch command is not supported by the thin logical volume at the replication site, sending a command to the thin logical volume at the replication site to write zeros to a portion of the thin logical volume at the replication site indicated by the punch command to free data from the storage; and
   computer program code for writing data being freed from the storage at the replication site to an undo stream of the journal at the replication site in response to the punch application.

* * * * *